(12) United States Patent
McDufford et al.

(10) Patent No.: US 10,221,699 B2
(45) Date of Patent: Mar. 5, 2019

(54) SHROUDED TURBINE ROTOR BLADES

(71) Applicant: General Electric Company, Schenectady, NY (US)

(72) Inventors: Michael David McDufford, Greenville, SC (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 14/979,812

(22) Filed: Dec. 28, 2015

(65) Prior Publication Data

US 2017/0183973 A1   Jun. 29, 2017

(51) Int. Cl.
  *F01D 5/26* (2006.01)
  *F01D 5/22* (2006.01)

(52) U.S. Cl.
  CPC .......... *F01D 5/225* (2013.01); *F05D 2260/36* (2013.01); *Y02T 50/671* (2013.01); *Y02T 50/673* (2013.01)

(58) Field of Classification Search
  CPC .................................. F01D 5/22; F01D 5/225
  USPC ................................................. 416/189, 190
  See application file for complete search history.

(56) References Cited

U.S. PATENT DOCUMENTS

| | | | |
|---|---|---|---|
| 4,257,741 A * | 3/1981 | Betts | B22F 7/064 228/122.1 |
| 6,568,908 B2 | 5/2003 | Namura | |
| 8,182,228 B2 | 5/2012 | Riley et al. | |
| 9,328,619 B2 * | 5/2016 | Chouhan | F01D 5/22 |
| 2009/0214345 A1 | 8/2009 | DeMania et al. | |
| 2009/0305079 A1 | 12/2009 | Ozbaysal et al. | |
| 2011/0194939 A1 | 8/2011 | Marra | |
| 2017/0183971 A1 | 6/2017 | McDufford et al. | |
| 2017/0183972 A1 | 6/2017 | McDufford | |
| 2017/0183974 A1 | 6/2017 | McDufford | |

FOREIGN PATENT DOCUMENTS

WO   2014/143292 A1   9/2014

OTHER PUBLICATIONS

Extended European Search Report and Opinion issued in connection with corresponding EP Application No. 16205154.4 dated Mar. 15, 2017.

* cited by examiner

*Primary Examiner* — Woody Lee, Jr.
*Assistant Examiner* — Jason Fountain
(74) *Attorney, Agent, or Firm* — Mark E. Henderson; Ernest G. Cusick; Frank A. Landgraff

(57) ABSTRACT

A rotor blade for a gas turbine configured for use within a row of samely configured rotor blades. The rotor blade may include an airfoil defined between pressure and suction faces and a midspan shroud. The midspan shroud may include pressure and suction wings. The pressure wing and suction wing of the midspan shroud may be configured so to cooperatively form an interface between neighboring ones of the rotor blades within the row of samely configured rotor blades. The interface may include: a pressure wing contact face disposed on the pressure wing that opposes across a gap a suction wing contact face disposed on the suction wing; and a predetermined offset between the pressure wing contact face and suction wing contact face. The predetermined offset may be configured for desirably aligning the contact faces when an expected operating condition closes of the gap.

18 Claims, 12 Drawing Sheets

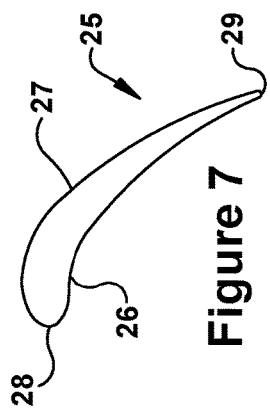
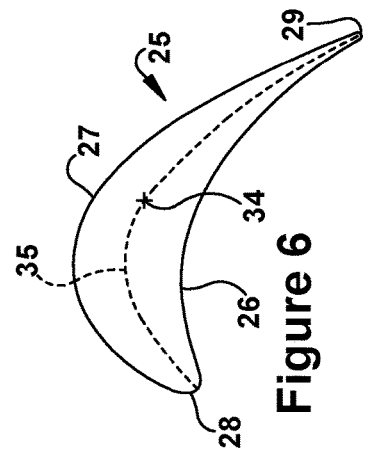
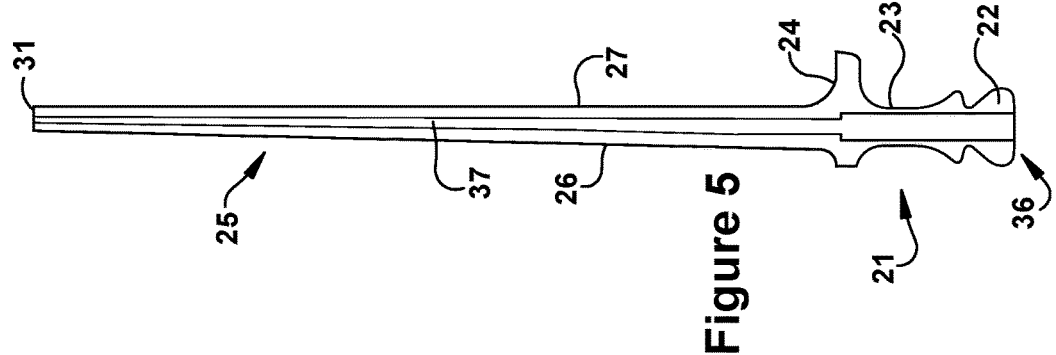
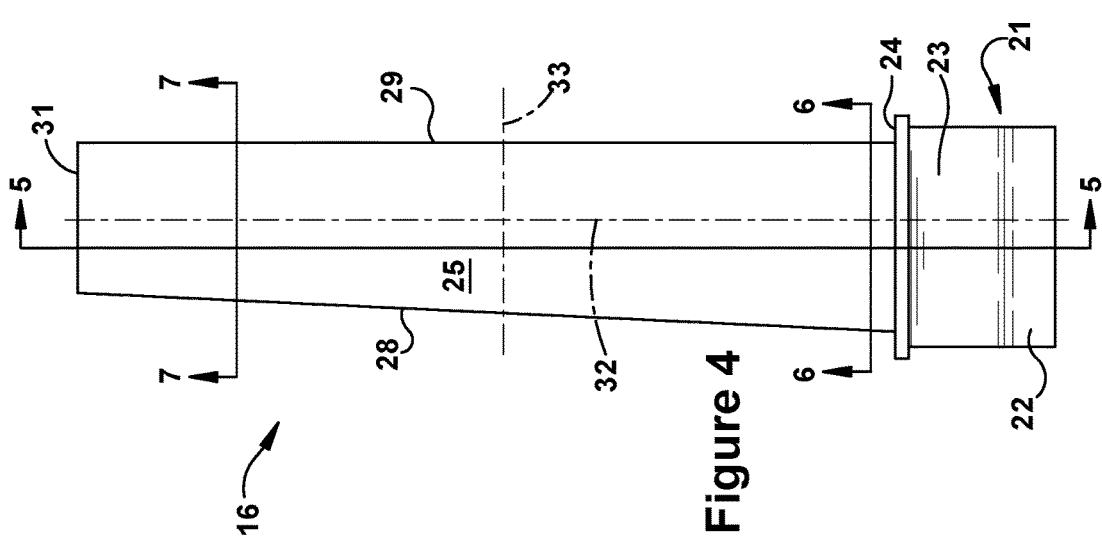

SHROUDED TURBINE ROTOR BLADES

BACKGROUND OF THE INVENTION

The present application relates generally to apparatus, methods and/or systems concerning the design, manufacture, and use of rotor blades in combustion or gas turbine engines. More specifically, but not by way of limitation, the present application relates to apparatus and assemblies pertaining to turbine rotor blades having midspan shrouds.

In combustion or gas turbine engines (hereinafter "gas turbines"), it is well known that air pressurized in a compressor is used to combust fuel in a combustor to generate a flow of hot combustion gases, whereupon the gases flow downstream through one or more turbines so that energy can be extracted therefrom. In accordance with such engines, generally, rows of circumferentially spaced rotor blades extend radially outwardly from a supporting rotor disc. Each rotor blade typically includes a dovetail that permits assembly and disassembly of the blade in a corresponding dovetail slot in the rotor disc, as well as an airfoil that extends radially outwardly from the dovetail and interacts with the flow of the working fluid through the engine. The airfoil has a concave pressure side and convex suction side extending axially between corresponding leading and trailing edges, and radially between a root and a tip. It will be understood that the blade tip is spaced closely to a radially outer stationary surface for minimizing leakage therebetween of the combustion gases flowing downstream between the turbine blades.

Shrouds at the tip of the airfoil or "tip shrouds" often are implemented on aftward stages or rotor blades to provide a point of contact at the tip, manage bucket vibration frequencies, enable a damping source, and to reduce the over-tip leakage of the working fluid. Given the length of the rotor blades in the aftward stages, the damping function of the tip shrouds provides a significant benefit to durability. However, taking full advantage of the benefits is difficult considering the weight that the tip shroud adds to the assembly and the other design criteria, which include enduring thousands of hours of operation exposed to high temperatures and extreme mechanical loads. Thus, while large tip shrouds are desirable because of the effective manner in which they seal the gas path and the stable connections they form between neighboring rotor blades, it will be appreciated that such shrouds are troublesome because of the increased pull loads on the rotor blade, particularly at the base of the airfoil because it must support the entire load of blade.

One way to address this is to position the shroud lower on the airfoil. That is to say, instead of adding the shroud to the tip of the airfoil, the shroud is positioned near the middle radial region. As used herein, such shrouds will be referred to as a "midspan shrouds." At this lower (i.e., more inboard) radius, the mass of the shroud causes a reduced level of stress to the rotor blade. However, several issues related to the design and usage of conventional midspan shrouds have been identified by the present inventors. These generally concern the performance of contact wear surfaces or pads that are included between midspan shrouds as a means of mechanically engaging neighboring airfoils for structural and other advantages. Even when robust, these contact surfaces wear quickly given the tendency of misalignment. Such misalignment results in the application of tensional and shear forces to the contact surfaces, which, because the contact surfaces are typically non-integral pads affixed to a surface of the midspan shroud, results in harmful wear that can quickly degrade the component. Additional issues, such as aerodynamic losses, also may result from such misalignment. Finally, to the extent that the weight of such shrouds may be reduced while still fulfilling structural criteria, the life of the rotor blade may be extended.

As will be appreciated, according to these and other criteria, the design of shrouded rotor blades includes many complex, often competing considerations. Novel designs that balance these in a manner that optimizes or enhances one or more desired performance criteria—while still adequately promoting structural robustness, part-life longevity, manufacturability, and/or cost-effective engine operation—represent economically valuable technology.

BRIEF DESCRIPTION OF THE INVENTION

The present application thus describes a rotor blade for a gas turbine configured for use within a row of samely configured rotor blades. The rotor blade may include: an airfoil defined between a concave pressure face and a laterally opposed convex suction face; and a midspan shroud. The midspan shroud may include a pressure wing extending from the pressure face of the airfoil and a suction wing extending from the suction face of the airfoil. The pressure wing and suction wing of the midspan shroud may be configured so to cooperatively form an interface between neighboring ones of the rotor blades within the row of samely configured rotor blades. The interface may include: a pressure wing contact face disposed on the pressure wing that opposes across a gap a suction wing contact face disposed on the suction wing; and a predetermined offset between the pressure wing contact face and suction wing contact face. The predetermined offset may be configured for desirably aligning the contact faces when an expected operating condition closes of the gap.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 4 is a side view of an exemplary turbine rotor blade that includes an internal cooling configuration and structural arrangement according to aspects and embodiments of the present application;

FIG. 5 is a section view along sight line 5-5 of FIG. 4;

FIG. 6 is a section view along sight line 6-6 of FIG. 4;

FIG. 7 is a section view along sight line 7-7 of FIG. 4;

DETAILED DESCRIPTION OF THE INVENTION

Figure 1:
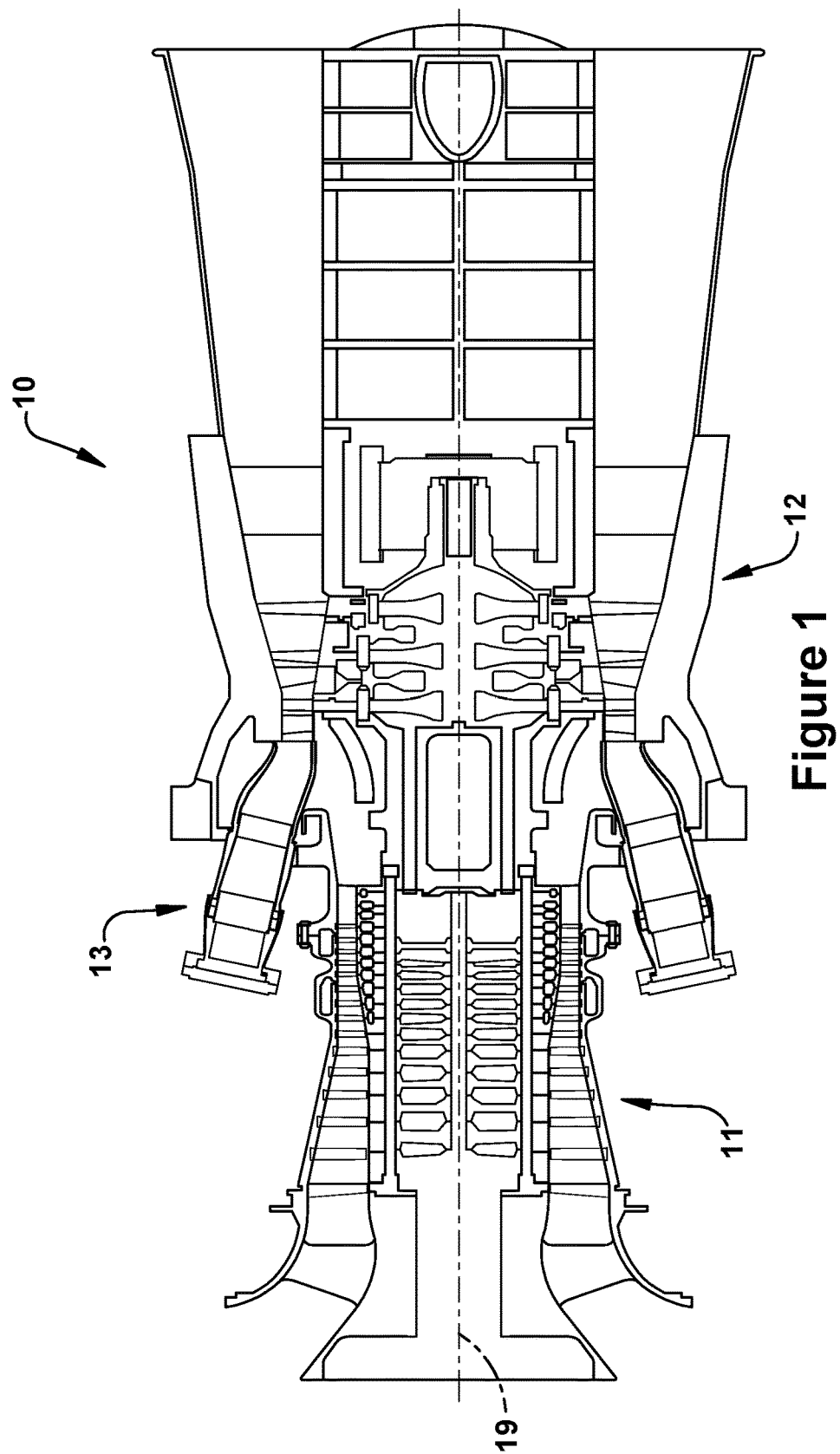
FIG. 1 is a schematic representation of an exemplary gas turbine that may include turbine blades according to aspects and embodiments of the present application.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. In understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. These terms and their definitions, unless specifically stated otherwise, are as follows.

The terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as relating to what would be understood by one skilled in the art as the flow direction through the conduit given normal or anticipated operation. As will be appreciated, within the compressor and turbine sections of the gas turbine, the working fluid is directed through and contained within an annularly shaped working fluid flowpath that is defined about the central axis of the engine. In such cases, the term "flow direction" may refer to a reference direction representing an idealized expected direction of flow of working fluid through the working fluid flowpath of the engine. This reference direction may be understood as one that is parallel to the central axis of the gas turbine and oriented in the downstream or aftward direction.

Accordingly, for example, the flow of working fluid through the working fluid flowpath of the gas turbine may be described as beginning as air pressurized through the compressor in the expected flow direction, becoming combustion gases in the combustor upon being combusted with a fuel, and, finally, being expanded in the expected flow direction as it passed through the turbine. Alternatively, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

As many components of gas turbines rotate during operation, such as compressor and turbine rotor blades, the terms rotationally lead and rotationally trail may be used to delineate positioning of subcomponents or subregions relative to rotation within the engine. Thus, as will be appreciated, these terms may differentiate position per the direction of rotation (hereinafter "rotation direction") within the compressor or turbine. The rotation direction may be understood as being the expected direction of rotation for a component given normal or anticipated operation of the gas turbine.

In addition, given the configuration of the gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or contextually apparent, these terms describing position relative to an axis should be construed as relating to the central axis of the compressor and turbine sections of the engine as defined by the rotor extending through each. However, the terms also may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like.

Figure 2:
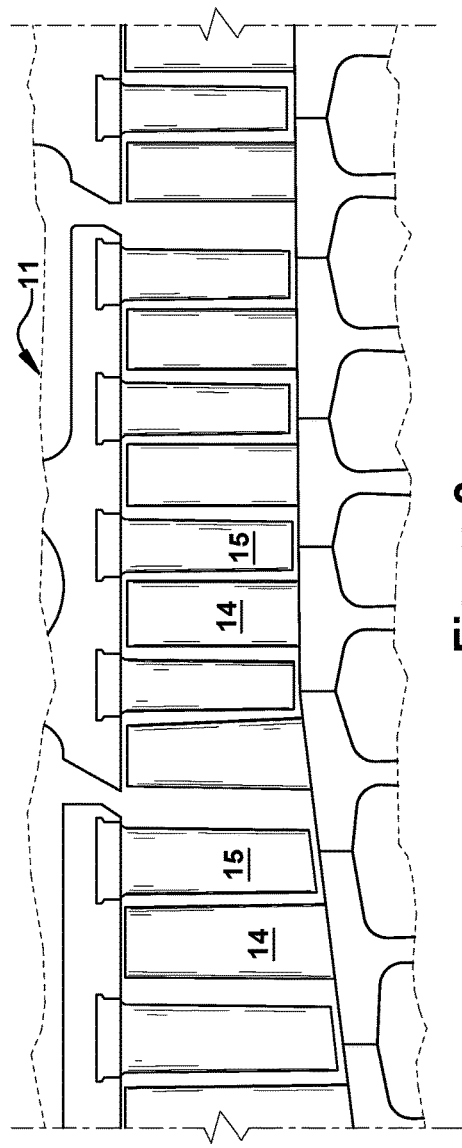
FIG. 2 is a sectional view of the compressor section of the gas turbine of FIG. 1.
Figure 3:
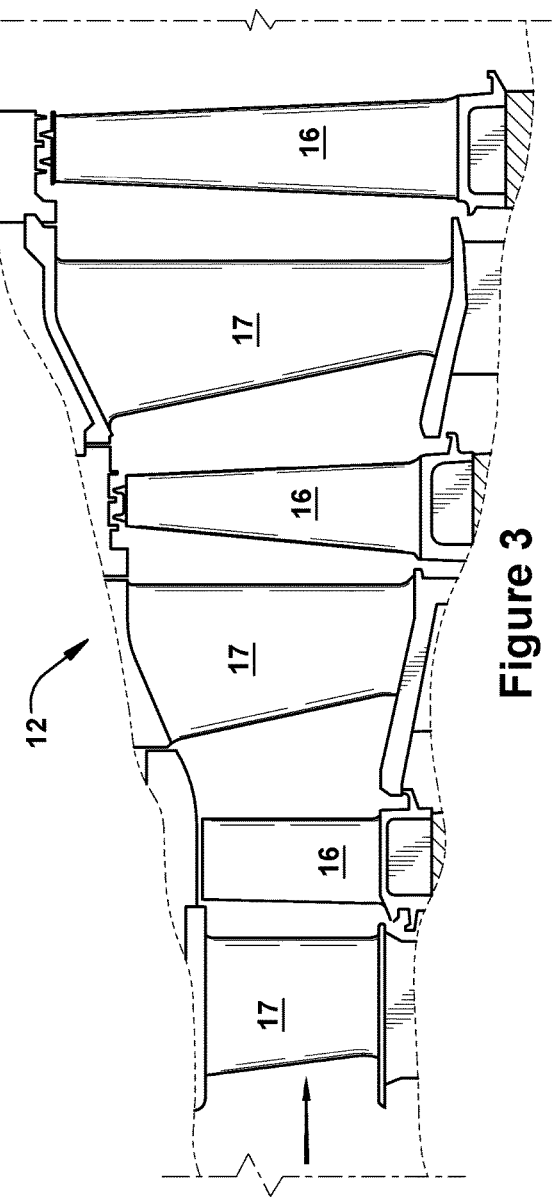
FIG. 3 is a sectional view of the turbine section of the gas turbine of FIG. 1.

By way of background, referring now with specificity to the figures, FIGS. 1 through 3 illustrate an exemplary gas turbine in accordance with the present invention or within which the present invention may be used. It will be understood by those skilled in the art that the present invention may not be limited to this type of usage. As stated, the present invention may be used in gas turbines, such as the engines used in power generation and airplanes, steam turbine engines, as well as other types of rotary engines as would be recognized by one of ordinary skill in the art. The examples provided, thus, are not meant to be limiting unless otherwise stated. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation. FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

For background purposes, FIGS. 4 through 7 provide views of a turbine rotor blade 16 in accordance with or within which aspects of the present invention may be practiced. As will be appreciated, these figures are provided to illustrate common configurations of rotor blades so to delineate spatial relationships between components and regions within such blades for later reference while also describing geometric constraints and other criteria that affect the internal and external design thereof. While the blade of this example is a rotor blade, it will be appreciated that, unless otherwise stated, the present invention also may be applied to other types of blades within the gas turbine.

The rotor blade 16, as illustrated, may include a root 21 that is used for attaching to a rotor disc. The root 21, for example, may include a dovetail 22 configured for mounting in a corresponding dovetail slot in the perimeter of a rotor disc. The root 21 may further include a shank 23 that extends between the dovetail 22 and a platform 24. The platform 24, as shown, forms the junction of the root 21 and an airfoil 25, with is the active component of the rotor blade 16 that intercepts the flow of working fluid through the turbine 12 and induces rotation. The platform 24 may define the inboard end of the airfoil 25 and a section of the inboard boundary of the working fluid flowpath through the turbine 12.

The airfoil 25 of the rotor blade may include a concave pressure face 26 and a circumferentially or laterally opposite convex suction face 27. The pressure face 26 and suction face 27 may extend axially between opposite leading and trailing edges 28, 29, respectively. The pressure face 26 and suction face 27 also may extend in the radial direction from an inboard end, i.e., the platform 24, to an outboard tip 31 of the airfoil 25. The airfoil 25 may include a curved or contoured shape extending between the platform 24 and the outboard tip 31. As illustrated in FIGS. 4 and 5, the shape of the airfoil 25 may taper gradually as it extends between the platform 24 to the outboard tip 31. The tapering may include an axial tapering that narrows the distance between the leading edge 28 and the trailing edge 29 of the airfoil 25, as illustrated in FIG. 4, as well as a circumferential tapering that reduces the thickness of the airfoil 25 as defined between the suction face 26 and the pressure face 27, as illustrated in FIG. 5. As shown in FIGS. 6 and 7, the contoured shape of the airfoil 25 may further include a twisting about the longitudinal axis of the airfoil 25 as it extends from the platform 24. The twisting typically is configured so to vary a stagger angle for the airfoil 25 gradually between the inboard end and outboard tip 31.

For descriptive purposes, as shown in FIG. 4, the airfoil 25 of the rotor blade 16 may further be described as including a leading edge section or half and trailing edge section or half defined to each side of an axial midline 32. The axial midline 32, according to its usage herein, may be formed by connecting the midpoints 34 of the camber lines 35 of the airfoil 25 between the platform 24 and the outboard tip 31. Additionally, the airfoil 25 may be described as including two radially stacked sections defined inboard and outboard of a radial midline 33 of the airfoil 25. Thus, as used herein, an inboard section or half of the airfoil 25 extends between the platform 24 and the radial midline 33, while an outboard section or half extends between the radial midline 33 and the outboard tip 31. Finally, the airfoil 25 may be described as including a pressure face section half and a suction face section or half, which, as will be appreciated are defined to each side of the camber line 35 of the airfoil 25 and the corresponding face 26, 27 of the airfoil 25.

The rotor blade 16 may further include an internal cooling configuration 36 having one or more cooling channels 37 through which a coolant is circulated during operation. The cooling channels 37 may extend radially outward from a connection to a supply source formed through the root 21 of the rotor blade 16. The cooling channels 37 may be linear, curved or a combination thereof, and may include one or more outlet or surface ports through which coolant is exhausted from the rotor blade 16 and into the working fluid flowpath.

Figure 8:
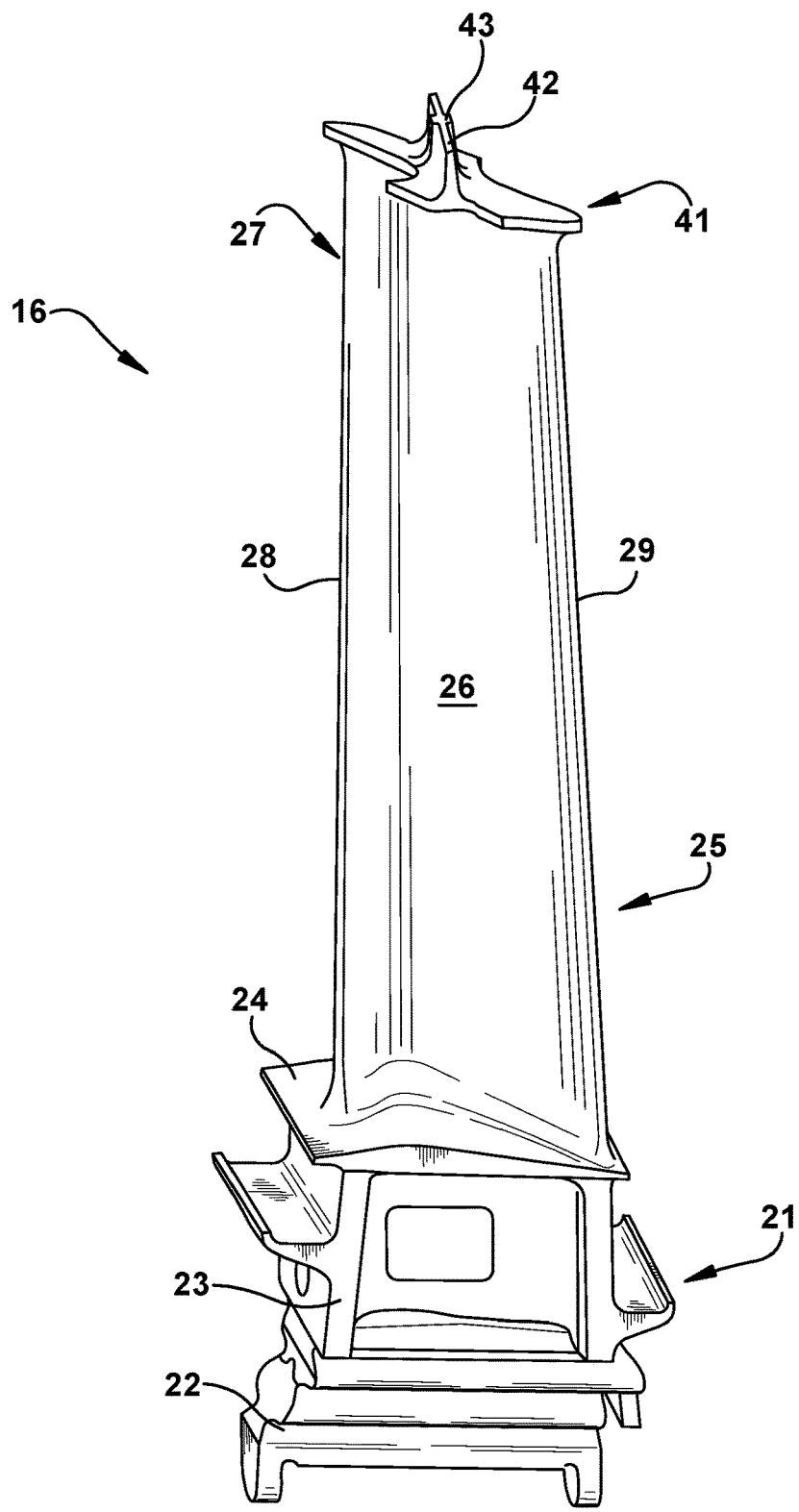
FIG. 8 is a perspective view of an exemplary turbine rotor blade that may include a tip shroud and configuration according to aspects and embodiments of the present application.

FIG. 8 provides a perspective view of an exemplary turbine rotor blade 16 that includes a tip shroud 41. As shown, the tip shroud 41 may be positioned near or at the outboard end of the airfoil 25. The tip shroud 41 may include an axially and circumferentially extending flat plate or planar component, which is supported towards its center by the airfoil 25. For descriptive purposes, the tip shroud 41 may include an inboard surface 45, outboard surface 44, and edge 46. As illustrated, the inboard surface 45 opposes the outboard surface 44 across the narrow radial thickness of the tip shroud 41, while the edge 46 connects the inboard surface 45 to the outboard surface 44 and, as used herein, defines a peripheral profile or shape of the tip shroud 41.

A seal rail 42 may be positioned along the outboard surface 44 of the tip shroud 41. Generally, as illustrated, the seal rail 42 is a fin-like projection that extends radially outward from the outboard surface 44 of the tip shroud 41. The seal rail 42 may extend circumferentially between opposite ends of the tip shroud 41 in the direction of rotation or "rotation direction" of the rotor blade 16. As will be appreciated, the seal rail 42 may be used to deter leakage of working fluid through the radial gap that exists between the tip shroud 41 and the surrounding stationary components that define the outboard boundary of the working fluid flowpath through the turbine. In some conventional designs, the seal rail 42 may extend radially into an abradable stationary honeycomb shroud that opposes it across that gap. The seal rail 42 may extend across substantially the entire circumferential length of the outboard surface 44 of the tip shroud 41. As used herein, the circumferential length of the tip shroud 41 is the length of the tip shroud 41 in the rotation direction 50. A cutter tooth 43 may be disposed on the seal rail 42. As will be appreciated, the cutter tooth 43 may be provided for cutting a groove in the abradable coating or honeycomb of the stationary shroud that is slightly wider than the width of the seal rail 42. The tip shroud 41 may include fillet regions that are configured to provide smooth surficial transitions between the divergent surfaces of the tip shroud 41 and the airfoil 25, as well as those between the tip shroud 41 and the seal rail 42.

Figure 9:
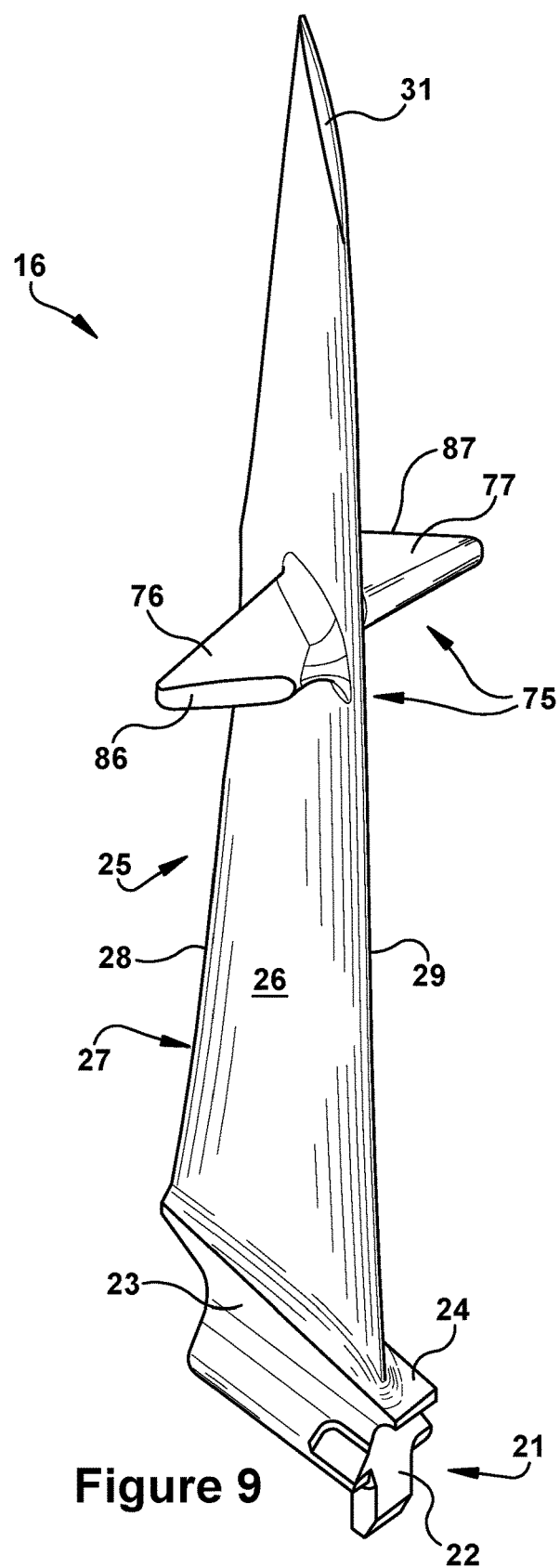
FIG. 9 is a perspective view of an exemplary rotor blade with midspan shroud in accordance with aspects of the present invention or within which the present invention may be used.
Figure 10:
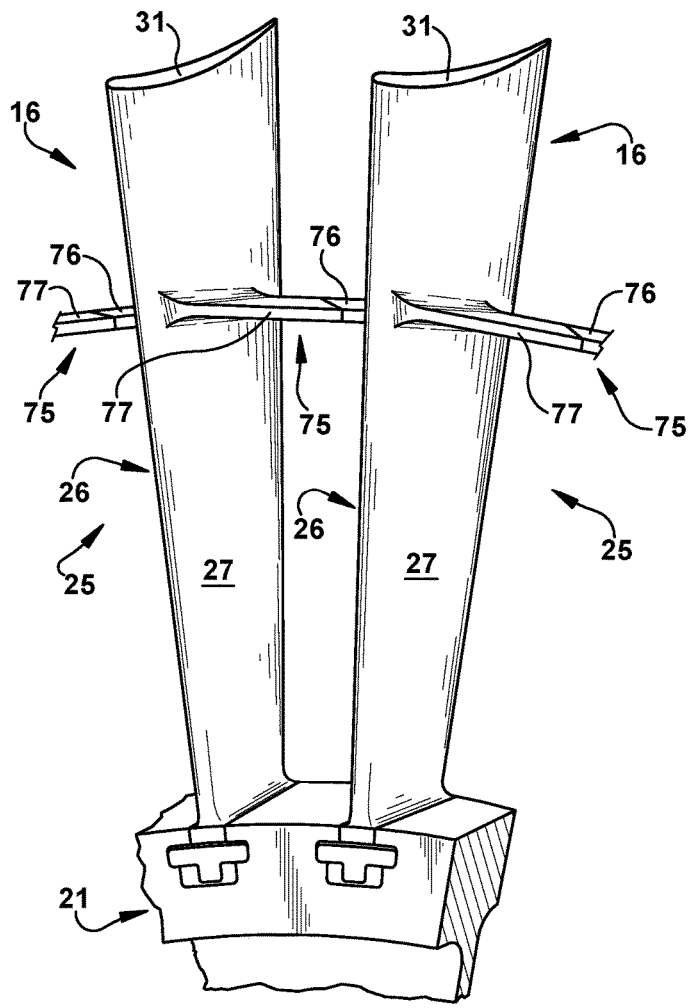
FIG. 10 is a perspective view of an exemplary installed arrangement of rotor blades with midspan shrouds in accordance with aspects of the present invention or within which the present invention may be used.
Figure 11:
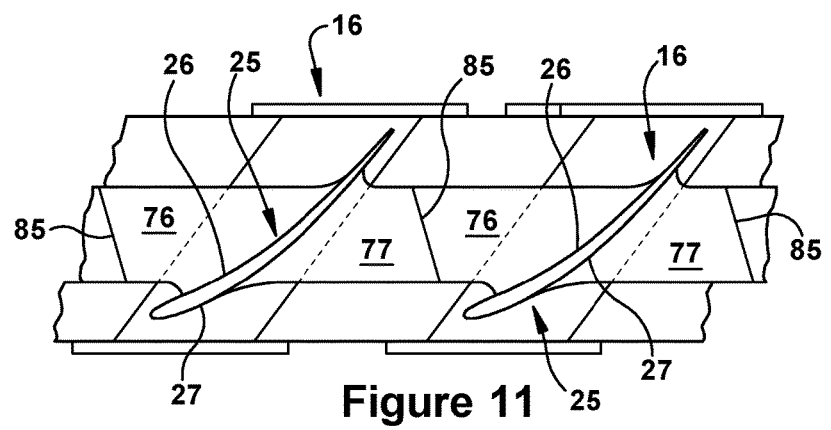
FIG. 11 is an outboard view of an exemplary installed arrangement of rotor blades with midspan shrouds in accordance with aspects of the present invention or within which the present invention may be used.
Figure 12:
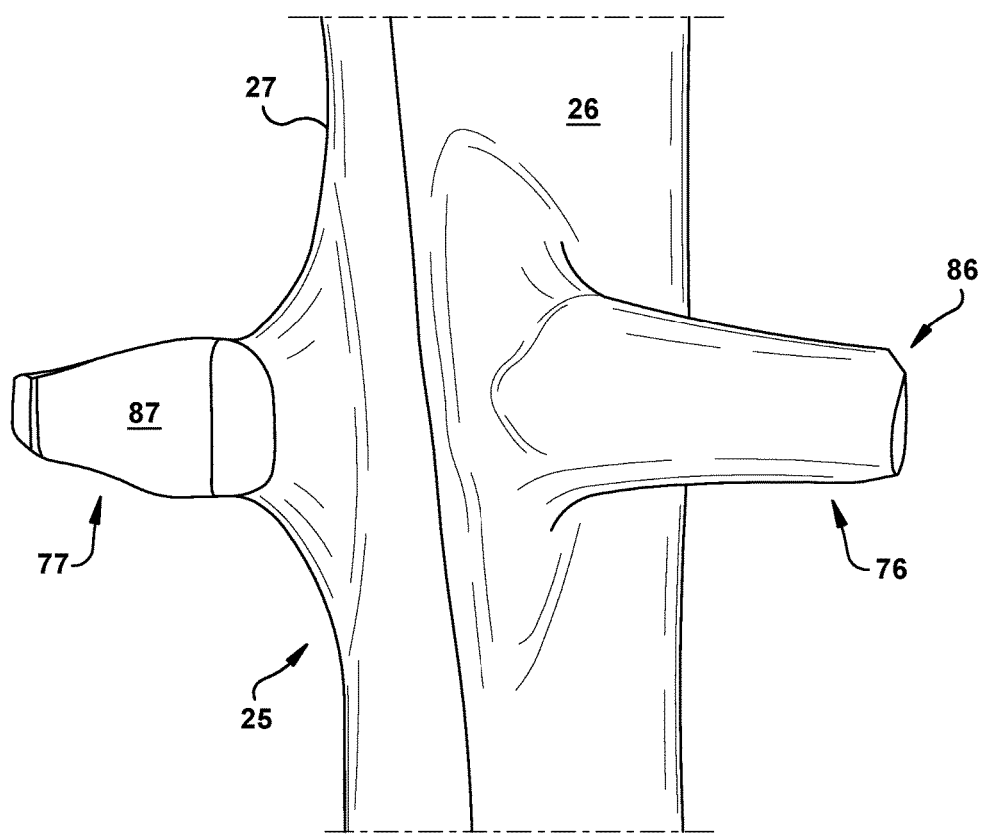
FIG. 12 is a perspective view of an airfoil having a midspan shroud in accordance with aspects of the present invention.

FIGS. 9 through 11 provide views of an exemplary turbine rotor blade having a midspan shroud in accordance with the present invention or within which aspects of the present invention may be practiced. FIG. 9 illustrates a perspective view of a rotor blade 16 in which the airfoil 25 includes an exemplary midspan shroud 75. As will be appreciated, the midspan shroud 75 shares certain features and attributes with the tip shroud 41 component just discussed. For example, like the tip shroud 41, the midspan shroud 75 may be configured to span between neighboring airfoils 25 within a row of installed rotor blades 16. As will be appreciated, though, unlike tip shrouds 41, midspan shrouds 75 are not positioned at or near the outboard tip 31 of the airfoil 25. Instead, as shown, midspan shrouds 75 coincide radially with the middle region of the airfoil 25. Accordingly, midspan shrouds 75 may be positioned near the radial midline 33 of the airfoil 25. According to another definition used herein, midspan shrouds 75 may be defined broadly as a shroud positioned inboard of an outboard tip 41 of the airfoil 25 and outboard of a platform 24. According to another definition used herein, a midspan shroud 75 also may be defined as one disposed within a radial range of the airfoil 25. Thus, according to certain embodiments, this radial range of may be defined as being between an inboard boundary of approximately 25% of the radial height of the airfoil 25 and an outboard boundary of approximately 85% of the radial height of the airfoil 25. According to other more specific embodiments, the range of positions of a midspan shroud 75 is defined as being between an inboard boundary of approximately 33% of the radial height of the airfoil 25 and an outboard boundary of approximately 66% of the radial height of the airfoil 25.

According to present configurations, the midspan shroud 75 may include wing-like projections extending from the sides of the airfoil 25. Each of these wing-like projections may be referred to according to the face 26, 27 of the airfoil 25 from which it extends. Thus, for descriptive purposes herein, the midspan shroud 75 is reference as including a pressure wing 76 that juts from the pressure face 26 of the airfoil 25, and a suction wing 77 that juts from the suction face 27 of the airfoil 25. As illustrated, each of the wings 76, 77 may be configured as an axially and circumferentially jutting component that is comparatively thin in the radial dimension compared to the radial height of the airfoil 25, thereby making them resemble "wings". Though this designation as "wings" is not intended to be limiting in ways not stated herein. As will be described in more detail below, each of the wings 76, 77 of the midspan shroud 75 may be configured to functionally cooperate with the opposite one of the wings 76, 77 of a similarly configured, neighboring rotor blade that is positioned next to it and within the same blade row. This functional cooperation may include both mechanical engagement as well as producing configurations improving the aerodynamic performance of the assembly.

FIG. 10 provides a perspective view of rotor blades 16 having midspan shrouds 75 as they might be arranged in an exemplary installed condition, while FIG. 11 provides a top view of the same assembly. As shown, the midspan shrouds 75 may be configured so to link or engage other midspan shrouds 75 of the rotor blades 16 that are adjacent to them. Thus, within the row of rotor blades 16, as illustrated, the pressure wing 76 that extends from the pressure face 26 of a first rotor blade 16 may be configured to cooperate with the suction wing 77 that extends from the suction face 27 of a second rotor blade 16 that resides to one side of the first rotor blade 16. Similarly, the suction wing 77 that extends from the suction face 27 of the first rotor blade 16 may be configured to cooperate with the pressure wing 76 that extends from the pressure face 26 of a third rotor blade 16 that resides to the other side of the first rotor blade 16. In this manner, the midspan shrouds 75 may be used to create a point of contact between the airfoils 25 of adjacent rotor blades 16 during operation. This point of contact may occur between a midspan shroud-to-shroud interface (hereinafter "interface 85"), across which a pressure wing contact face 86 and a suction wing contact face 87 may engage each other. This contact may be intermittent or constant and may depend upon an operating mode of the gas turbine. As will be appreciated, the linking of the airfoils 25 of rotor blades 16 in this manner may be done to increase the natural frequency of the assembly and dampen operational vibrations, which may reduce the overall mechanical stresses on the rotor blades 16 and prolong useful life.

Figure 13:
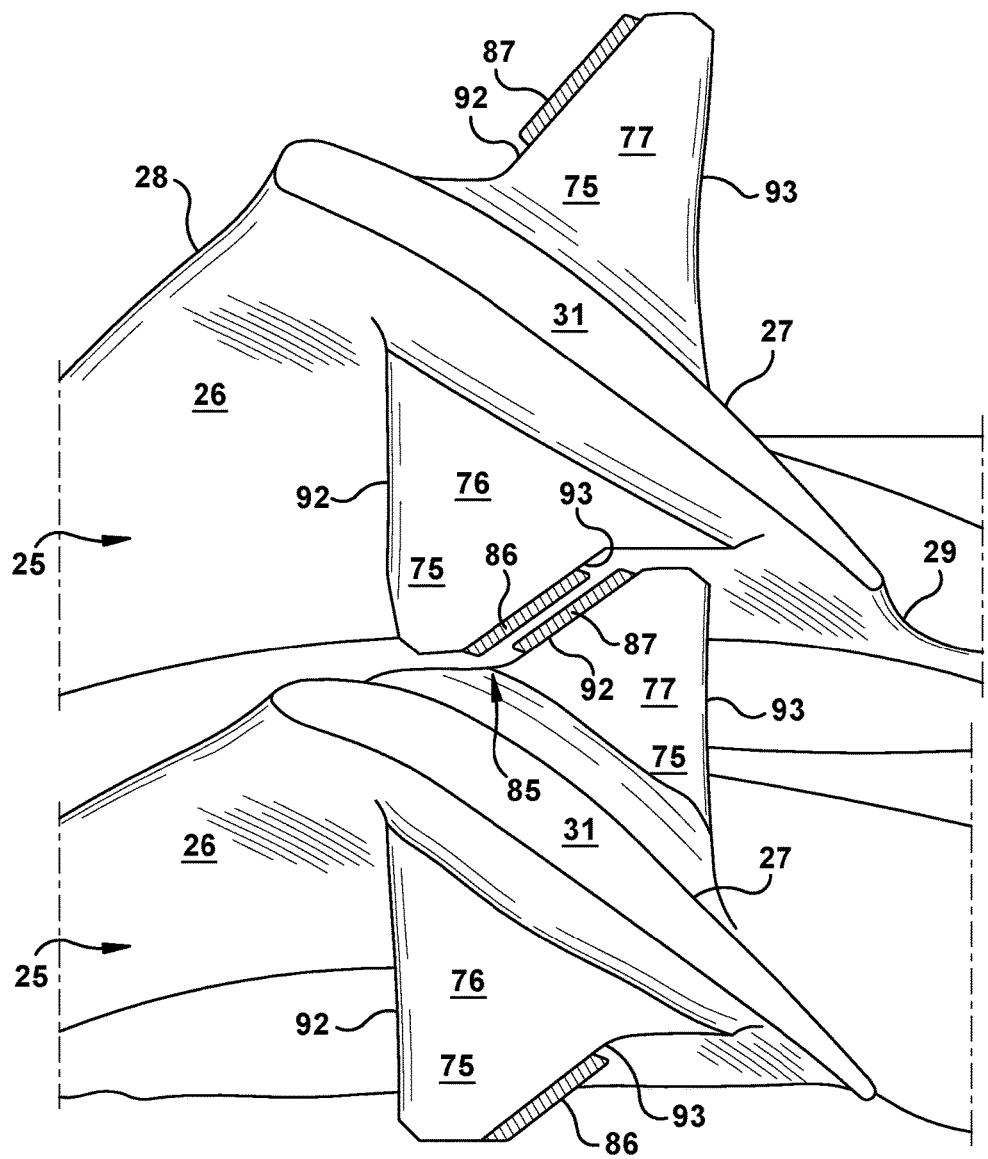
FIG. 13 is a perspective view of an exemplary installed arrangement of rotor blades with midspan shrouds that form an interface in accordance with embodiments of the present invention.
Figure 14:
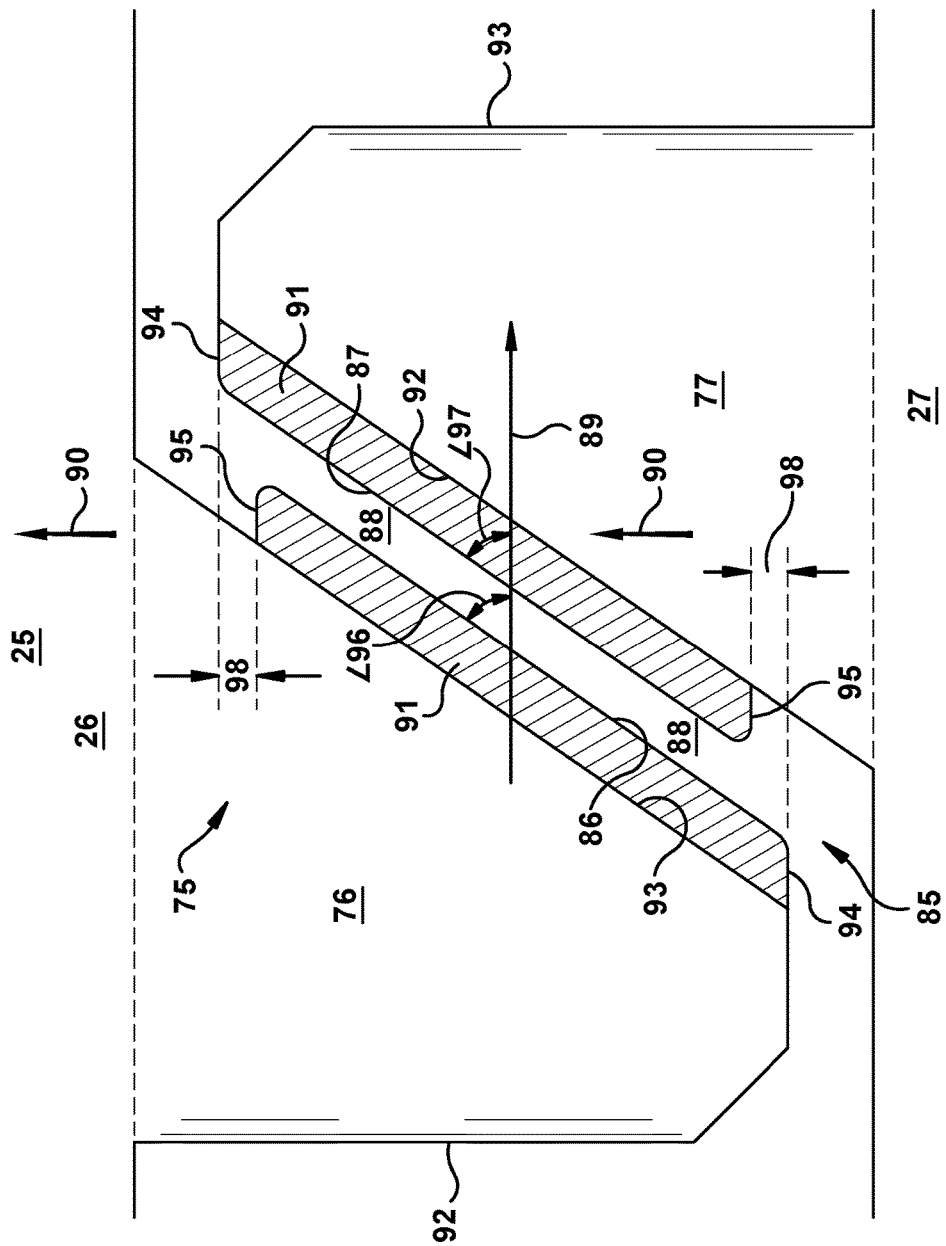
FIG. 14 is an outboard profile view of an exemplary installed arrangement of rotor blades with midspan shrouds that form an interface in accordance with embodiments of the present invention.

With specific reference now to FIGS. 12 through 15, several configurations of rotor blades 16 having midspan shrouds are presented that are in accordance with certain aspects and exemplary embodiments of the present invention. As will be appreciated, these examples are described with reference to and in light of the components and related concepts already provided herein, particularly those discussed in relation to the preceding figures. As before, the midspan shroud 75 may include a pressure wing 76 extending from the pressure face 26 of the airfoil 25 and a suction wing 77 extending from the suction face 27 of the airfoil 25. The pressure wing 76 and suction wing 77 of the midspan shroud 75 may be configured so to cooperatively form an interface 85 between neighboring rotor blades of the same design once such blades are installed side by side on a rotor disc. As will be appreciated, the interface 85 may include a pressure wing contact face 86 disposed on the pressure wing 76 and a suction wing contact face 87 disposed on the suction wing 77. The interface 85 may include the contact faces 86, 87 opposing each other across a gap 88. Once the rotor blades are installed, the gap 88 of the interface 85 may vary in distance. That is to say, the gap 88, as shown in FIG. 14, may be wider in a cold-build or cold state, which is when the engine is not operating. In other conditions, for example when the engine is operating at capacity (i.e., a hot state), the gap 88, as is shown in FIG. 11, may substantially close so that the contact faces 86, 87 are brought together.

According to the present invention, in the cold state, the gap 88 may be wide and the relative alignment and position between the contact faces 86, 87 of the interface 85 may include a predetermined offset. As provided herein, this predetermined offset may be configured such that a desirable alignment between the contact faces 86, 87 is achieved when operating conditions close the gap 88. That is to say, the interface 85 includes a predetermined offset between the contact faces 86, 87 configured for desirably aligning the pressure wing contact face 86 against the suction wing contact face 87 when expected operating conditions result in closing the gap 88.

As discussed in relation to FIG. 4 through 7, the airfoils of rotor blades are often constructed with a twisting configuration. This is typically done to vary the stagger angle of the airfoil gradually relative to the radial height of the blade. This twist, thus, occurs about the longitudinal axis as the airfoil 25 as it extends radially between the platform 24 and outboard tip 31 as depicted in the FIGS. 6 and 7. During normal operation, the rotational speeds of the rotor blades may cause the airfoil 25 to "untwist" slightly, and this may narrow the gap 88 of the interface 85 until the contact faces 86, 87 are brought together. Once contact is made, a supporting midspan shroud ring is created, which may beneficially reduce vibration, improve durability, and resists any further untwisting. As will be appreciated, this untwisting of the airfoil 25 may cause other types of relative movement between the contact faces 86, 87 other than the axial movement that results in closing the gap 88. That is to say, the untwisting airfoils 25 may circumferentially, radially, and/or angularly deflect, relative to each other, the contact faces 86, 87 across the interface 85. The expected operating condition causing such deflections and relative movement may be defined as operation necessary for sufficiently untwisting the airfoil 25 so to close the gap 88. For example, the expected operating condition may include a predetermined rotational speed within the engine that causes the necessary untwisting. According to certain embodiments, the expected operating condition may be defined as a predetermined rotational speed and operating temperature of the engine. For example, the expected operating condition may corresponds to an operating mode of the gas turbine that is equal to or greater than 90% of the rated load of the engine.

For descriptive purposes, a gas turbine includes a working fluid flowpath defined through a compressor positioned at a forward end and a turbine positioned at an aftward end. As will be appreciated, this orientation may be used to define a forward direction and an aftward direction within the gas turbine and its component sections. Further, as used herein, the term "flow direction" (as indicated by arrow 89) refers to the general direction of working fluid flow through the working fluid flowpath given normal operation. Within the compressor and turbine sections, thus, the term flow direction may be understood as being an idealized reference direction, which is defined as being parallel to the central axis of the gas turbine and oriented in the aftward direction. As mentioned, the term "rotation direction" (as indicated by arrow 90) refers to an expected direction of rotation for rotor blades during normal operating conditions within the compressor or turbine sections of the engine. Finally, unless otherwise stated, it should be understood that the present invention may be used in conjunction with rotor blades configured for use in the compressor or turbine sections of a gas turbine. As illustrated, one preferred embodiment includes use in conjunction with rotor blades configured specifically for the turbine section of the engine.

Given the above definitions, it will be appreciated that the pressure wing 76 and suction wing 77 each may be described as including a forward face 92 and an aftward face 93. As illustrated, the forward face 92 of each faces toward the forward end of the gas turbine (or in the upstream direction) and the aftward face 93 of each faces toward the aftward end of the gas turbine (or in the downstream direction). As illustrated, the interface 85 may be formed between circumferentially overlapping sections of the pressure wing 76 and the suction wing 77. Within this circumferential overlap, according to a preferred embodiment, the pressure wing 76 is positioned forward of the suction wing 77. As will be appreciated, in such cases, the pressure wing contact face 86 is formed on the aftward face 93 of the pressure wing 76, and the suction wing contact face 87 is formed on the forward face 92 of the suction wing 77.

According to certain preferred embodiments, as illustrated in FIGS. 13 and 14, the pressure wing contact face 86 may be configured as a non-integral pad 91 that is affixed to the aftward face 93 of the pressure wing 76. In similar fashion, the suction wing contact face 87 also may be configured as a non-integral pad 91 that is affixed to the forward face 92 of the suction wing 77. The aftward face 93 of the pressure wing 76 to which the non-integral pad 91 is affixed may be configured as a substantially flat surface. The forward face 92 of the suction wing 77 to which the non-integral pad 91 is affixed also may be configured as a substantially flat surface. In such cases, the non-integral pads 91, thus, may form a raised contact surface relative the surrounding surfaces to which each attaches. Thought other configurations are possible, the non-integral pad 91 of the aftward face 93 of the pressure wing 76 may include a constant thickness such that, upon being affixed thereto, the pressure wing contact face 86 is formed as a substantially flat surface. Likewise, the non-integral pad 91 of the forward face 92 of the suction wing 77 may include a constant thickness such that, upon being affixed thereto, the suction wing contact face 87 is formed as a substantially flat surface.

Additionally, as used herein for descriptive purposes, an outboard profile of the interface 85 refers to the profile of the interface 85 as viewed from an outer radial perspective. Examples of the outboard profile of the interface are depicted in FIGS. 13 and 14. Referencing the outboard profile (and specifically FIG. 14), each of the pressure wing contact face 86 and suction wing contact face 87 may be described as having a far edge 94 and a near edge 95, which are so designated relative to the distance of each from the airfoil 25 to which it is attached.

As shown most clearly in the outboard profile of FIGS. 14, the pressure wing contact face 86 and the suction wing contact face 87 each may include a canted configuration relative to the flow direction 89. The canted configuration of the pressure wing contact face 86 may include a slanting toward or into the rotation direction 90 as the pressure wing contact face 86 extends from the far edge 94 to the near edge 95. In regard to the suction wing contact fact, the canted configuration may include a slanting toward or into the rotation direction 90 as the suction wing contact face 87 extends from the near edge 95 to the far edge 94. The canted configuration may be more particularly described via the angles formed relative to the flow direction 89. As indicated, the slanting of the pressure wing contact face 86 may form a first angle 96 between the pressure wing contact face 86 and the flow direction 89, and this first angle 96 may be between 10 and 80 degrees or, more preferably, 20 to 70 degrees. Similarly, the slanting of the suction wing contact face 87 may form a second angle 97 between the suction wing contact face 87 and the flow direction 89, and this second angle 97 may be between 10 and 80 degrees or, more preferably, 20 to 70 degrees.

As stated, the predetermined offset according to the present invention may include one or more directional components that compensate for relative deflections or movement occurring between the contact surfaces 86, 87 of one of the interfaces 85. According to certain preferred embodiments, as indicated in FIG. 14, the predetermined offset of the interface 85 includes a circumferential component, which will be referenced herein as a circumferential offset 98. The circumferential offset 98 may include the suction wing contact face 87 rotationally leading the pressure wings contact fare 86. More specifically, relative the rotation direction 90, the predetermined offset may include the far edge 94 of the suction wing contact face 87 rotationally leading by the circumferential offset 98 the near edge 95 of the pressure wing contact face 86. The predetermined offset may further include the near edge 95 of the suction wing contact face 87 rotationally leading the far edge 94 of the pressure wing contact face 86 by the circumferential offset 98. As will be appreciated, the relative movement between the pressure wing contact face 86 and the suction wing contact face 87 when the untwisting of the airfoils 25 occurs may include an anticipated circumferential deflection and that the circumferential offset 98 may be configured to correspond to this deflection such that: the far edge 94 of the suction wing contact face 87 circumferentially aligns with the near edge 95 of the pressure wing contact face 86 when the expected operating condition closes the gap 88; and the near edge 95 of the suction wing contact face 87 circumferentially aligns with the far edge 94 of the pressure wing contact face 86 when the expected operating condition closes the gap 88.

Figure 15:
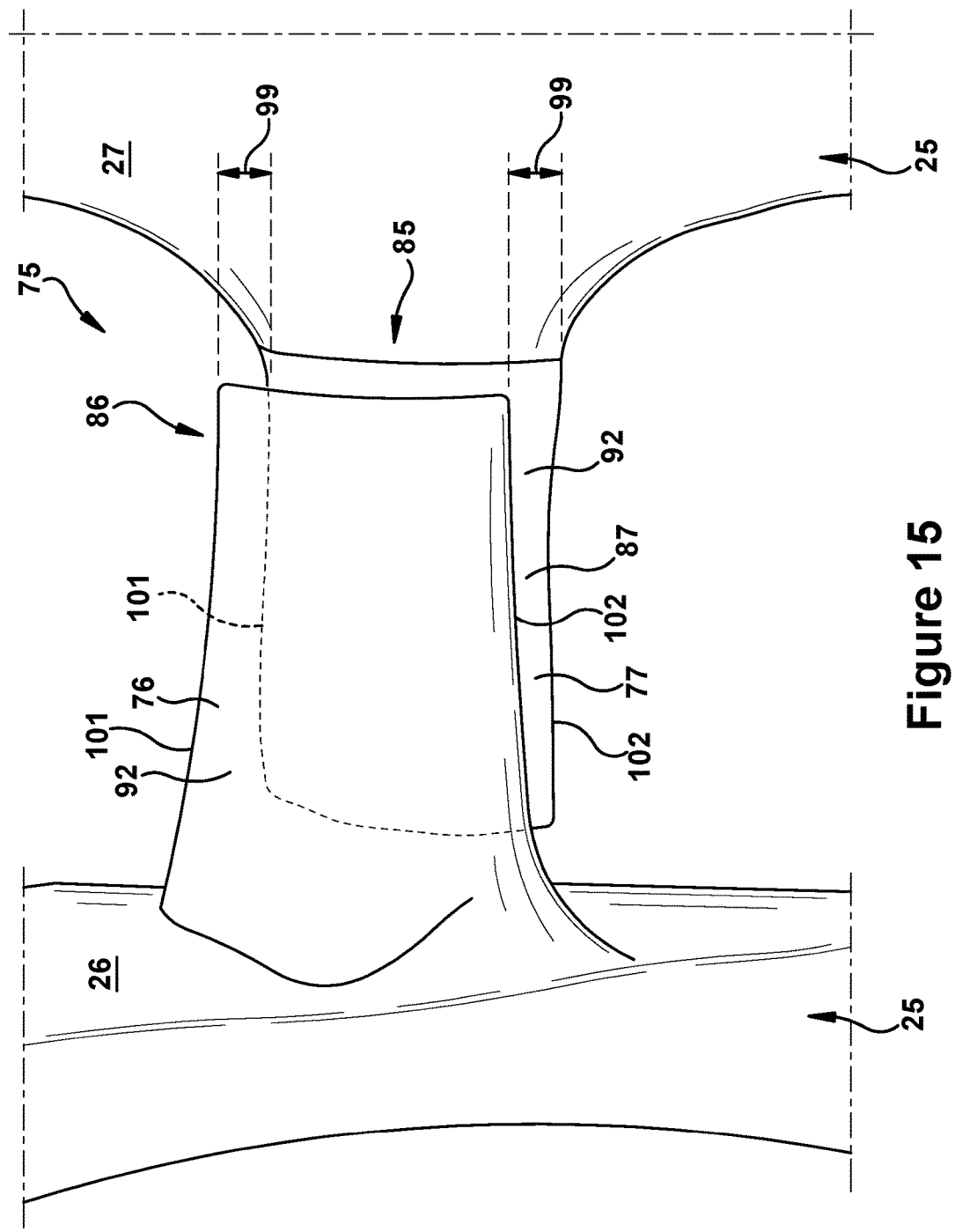
FIG. 15 is a view looking downstream of an exemplary installed arrangement of rotor blades with midspan shrouds forming an interface in accordance with embodiments of the present invention.

According to other preferred embodiments, as shown in FIG. 15, the predetermined offset of the interface 85 includes a radial component, which will be referred to herein as a radial offset 99. More specifically, the radial offset 99, as indicated, may include the pressure wing contact face 86 being offset in the outer radial or outboard direction relative to the suction wing contact face 87. In such cases, as illustrated, an outboard edge 101 of the pressure wing contact face 86 may be positioned outboard by the radial offset 99 of an outboard edge 101 of the suction wing contact face 87. As also indicated, an inboard edge 102 of the pressure wing contact face 86 may be positioned outboard by the radial offset 99 of an inboard edge 102 of the suction wing contact face 87. As will be appreciated, the relative movement between the pressure wing contact face 86 and the suction wing contact face 87 when the airfoils untwist due to operational loading may result in an anticipated radial deflection, and the distance of the radial offset 99 may be configured to correspond to this radial deflection such that: the outboard edge 101 of the pressure wing contact face 86 radially aligns with the outboard edge 101 of the suction wing contact face 87 when the expected operating condition closes the gap 88; and the inboard edge 102 of the pressure wing contact face 86 radially aligns with the inboard edge 102 of the suction wing contact face 87 when the expected operating condition closes the gap 88.

According to other preferred embodiments, the predetermined offset of the interface 85 may include an angular offset. As previously discussed in relation to FIG. 14, each of the contact faces 86, 87 form angles 96, 97 relative to the flow direction 89. The predetermined offset may include an angular offset, which is expressed as a difference between the angles 96, 97 that the pressure wing contact face 86 and suction wing contact face 87 form with the flow direction 89. As will be appreciated, the relative movement between the pressure wing contact face 86 and the suction wing contact face 87 when the airfoils untwist due to operational loading may result in an anticipated angular deflection. According to preferred embodiments, the angular offset of the predetermined offset may be configured to correspond to this angular deflection such that the pressure wing contact face 86 angularly aligns with the suction wing contact face 87 when operating conditions close the gap 88. As will be appreciated, when such angular alignment occurs, the two angles 96, 97 will be the same, i.e., the pressure wing contact face 86 and the suction wing contact face 87 will be parallel.

The above-described configurations that include the predetermined offset may be used to improve the alignment at contact between contact faces within the interface and, thereby, enhance the robustness of the contact made therebetween. The aligning of the contact faces at the point of contact results in each being compressed fully against one another. This resulting state of full compression may be used to limit or eliminate the much more harmful tensile and shear stresses from occurring, which are the stressors that degrade the assembly so quickly, particularly when the wear pads are non-integral components of the rotor blade. As will be appreciated, this is an improvement over traditional designs that place such non-integral wear pads within recesses formed in the surface of wings of the midspan shrouds. Such conventional arrangements increase resultant tensile forces within the wear pads and, thereby, increase the likelihood of the wear pad tearing and breaking free. This results in increasing the risk of unplanned outages due to wear pad cracking or fracture from high contact loads. In contrast, configurations of the present invention may be employed under such high contact load conditions without shortening component life or increasing the risk of such failures.

Figure 16:
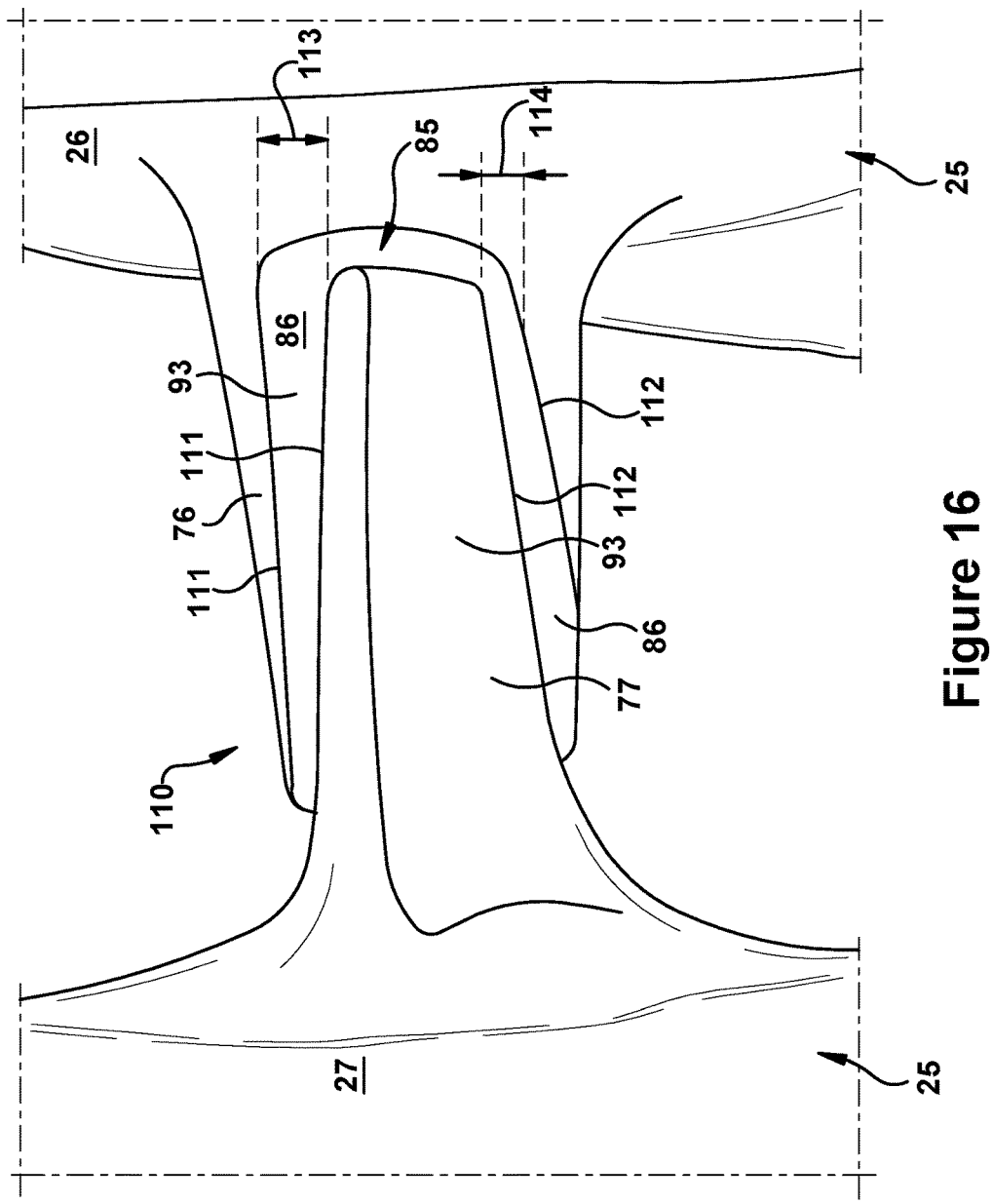
FIG. 16 is a view looking upstream of an exemplary installed arrangement of rotor blades with midspan shrouds forming an interface in accordance with embodiments of the present invention.
Figure 17:
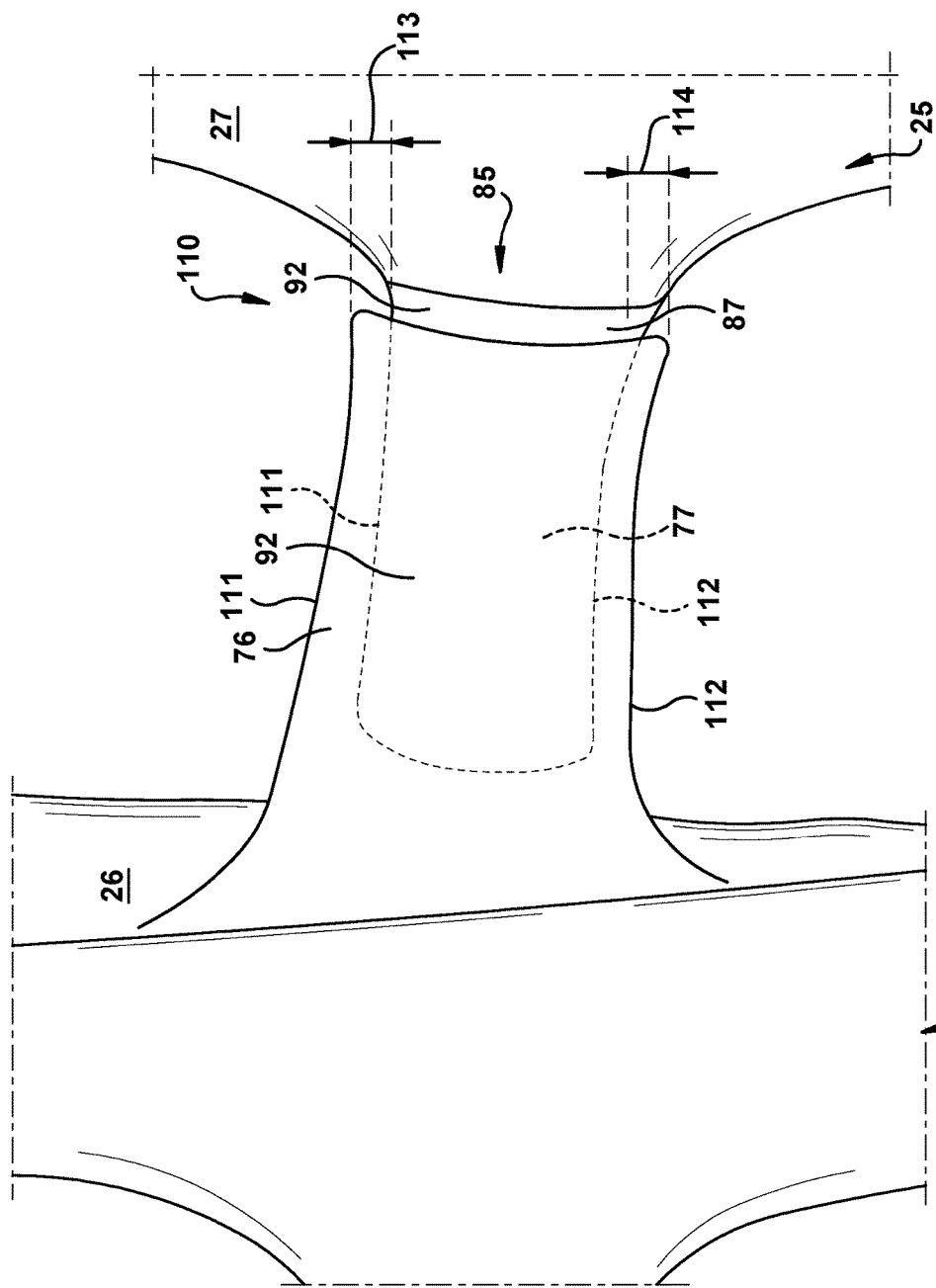
FIG. 17 is a view looking downstream of an exemplary installed arrangement of rotor blades with midspan shrouds forming an interface in accordance with embodiments of the present invention.

With reference now to FIGS. 16 and 17, an alternative embodiment of the present invention is shown that may be used to increase the likelihood that the interface 85 of midspan shrouds 75 maintains an aerodynamically advantageous alignment during operation. As will be appreciated, the relative movement and the extent of that movement between the pressure wing 76 and suction wing 77 of an interface 85 may include periods where expected movement differs from actual. For example, this may be true during transient operating periods or operation involving anomalous events such as component malfunction or system irregularities. Given this, a turbine operator may prefer having a midspan shroud configuration that safeguards against the likeliness that the pressure wing 76 and suction wing 77 misalign in ways that negatively impact aerodynamic performance. In such cases, according to alternative aspects of the present invention and as illustrated in FIGS. 16 and 17, this safeguard may be achieved by constructing the pressure wing 76 and suction wing 77 so that cooperatively they form a particular configuration which will be referred to herein as a downstream narrowing step 110.

The downstream narrowing step 110 of the present invention may be configured by constructing the wings 76, 77 of the shroud with differing radial thicknesses and then positioning them relative to each other so that the radial thickness of the assembly narrows in the downstream or aftward direction and maintains this general alignment even through operating conditions that result in considerable radial deflection of the wings 76, 77. As discussed more below, this may be accomplished by creating a radial buffer that allows significant relative radial movement in either direction, i.e., inboard or outboard, before misalignment between the wings 76, 77 occurs. In this manner, the interface 85 may be constructed to increase the likelihood that the more aerodynamic forward face 92 of the forward-most or, as it will be generally referred to herein as, the "upstream wing" into the flow of working fluid no matter what the relative radial movement between the wings 76, 77 turns out to be, even when unforeseen circumstances or anomalies result in relative movement that is unexpected or outside of anticipated norms. Thus, according to exemplary embodiments, an interface 85 having the downstream narrowing step 110 may include the forward-most or upstream wing 76, 77 (which, in accordance with certain preferred embodiments, may be the pressure wing 76, but may also be the suction wing 77) being configured so to have a greater radial thickness than the downstream wing 76, 77, which is the term that will be used herein to refer to the aftward-most wing. According to preferred embodiments, the radial thickness of the upstream wing may be between 1.05 and 1.5 times greater than the radial thickness of the downstream wing, or, more preferably, between 1.2 and 1.4 times greater.

For descriptive purposes relative to FIGS. 16 and 17, the term "radial range" refers to the range defined between an outboard edge 111 and an inboard edge 112 of the pressure wing 76 or the suction wing 77. That range may be understood as being defined by a rotor blade in an installed condition, and so may be understood as a radial range within the working fluid flowpath. Further the radial range of a rotor blade may be determined in a cold-build state. Accordingly, assuming that in the present configuration the pressure wing 76 is the upstream wing and the suction wing 77 is the downstream wing, embodiments of the present invention include the pressure wing 76 and suction wing 77 being positioned radially such that, within the circumferentially overlapping sections of the interface 85, the radial range of the suction wing 77 is both less than and wholly contained within the radial range of the pressure wing 76. Given this configuration, it will be appreciated that the pressure wing 76 and suction wing 77 are configured such that the outboard edge 111 of the pressure wing 76 resides outboard of the outboard edge 111 of the suction wing 77, as illustrated. As further indicated, the radial difference by which the outboard edge 111 of the pressure wing 76 is offset in the outboard direction from the outboard edge 111 of the suction wing 77 may constitute a buffer, which will be referred to herein as an outboard buffer 113. The pressure wing 76 and suction wing 77 may be further configured such that the inboard edge 112 of the pressure wing 76 resides inboard of the inboard edge 112 of the suction wing 77. As illustrated, the radial difference by which the inboard edge 112 of the pressure wing 76 is offset in the inboard direction from the inboard edge 112 of the suction wing 77 may constitute a buffer, which will be referred to herein as an inboard buffer 114. As will be appreciated, the extent of the outboard buffer 113 and inboard buffer 114 may be configured so to provide an increased likelihood that the assembly maintains the aerodynamically advantageous downstream narrowing step 110 over a greater range of possible operating conditions and relative movement between the pressure wing 76 and suction wing 77 that relate thereto.

As will be appreciated, this continued maintenance of the downstream narrowing step 110 through a greater range of operating conditions may generally enhance overall aerodynamic performance. This is done by enabling that the smooth, contoured forward face 92 of the upstream wing 76, 77 of the interface 85 meets the flow of working fluid instead of the forward face 92 of the downstream wing 76, 77, which typically is configured as a blunt, flat, less aerodynamic face due to its intended primary function as a contact face. That is to say, the forward face 92 of the upstream wing 76, 77, as illustrated, is typically configured as a smooth aerodynamic tapering surface, which tapers or narrows in the upstream direction, because it is intended that it directly interacts with the flow of working fluid. The forward face 92 of the downstream wing 76, 77 is usually configured having a blunt, flat face, which is aimed directly into the flow of working fluid, because it is not intended to perform for purposes related to aerodynamics, but as a contact face. Preferably, according to the present invention, this blunt face remains in the wake of or shielded by the wider upstream wing 76, 77 so that its interaction with the working fluid is indirect and limited. Otherwise it will negatively impact aerodynamic performance. As will be appreciated, the avoidance of such aerodynamic losses may generally increase the overall efficiency of the engine.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A rotor blade for a gas turbine, the rotor blade being configured for use within a row of samely configured rotor blades attached to and circumferentially spaced about a rotor disc, the rotor blade further including:
    an airfoil defined between a concave pressure face and a laterally opposed convex suction face, wherein the pressure face and the suction face extend axially between opposite leading and trailing edges and radially between an outboard tip and an inboard end that attaches to a root configured for attaching the rotor blade to the rotor disc; and
    a midspan shroud comprising a pressure wing extending from the pressure face of the airfoil and a suction wing extending from the suction face of the airfoil;
    wherein the pressure wing and the suction wing of the midspan shroud are configured so to cooperatively form an interface between installed neighboring ones of the rotor blades within the row of samely configured rotor blades;
    wherein the interface comprises:
        a pressure wing contact face disposed on the pressure wing that opposes across a gap a suction wing contact face disposed on the suction wing; and
        a predetermined offset between the pressure wing contact face and the suction wing contact face, the predetermined offset being configured for desirably aligning the pressure wing contact face against the suction wing contact face when an expected operating condition closes of the gap such that contact therebetween results;
    wherein the airfoil comprises a twisting configuration in which the airfoil is constructed having a twist about a longitudinal axis as the airfoil extends radially between the inboard end and the outboard tip, an untwisting of which causes relative movement between the pressure wing contact face and the suction wing contact face of the interface;
    wherein the expected operating condition comprises a predetermined rotational speed of the rotor blade within the turbine, the predetermined rotational speed comprising one corresponding to operation at or above 90% of a rated load of the gas turbine;
    wherein the twisting configuration of the airfoil is configured so to gradually vary a stagger angle for the airfoil between the inboard end and outboard tip; and
    wherein the midspan shroud comprises a shroud that is disposed within a range of positions on the airfoil, the range of positions defined between an inboard boundary at 25% of a radial height of the airfoil and an outboard boundary at 85% of the radial height of the airfoil.

2. The rotor blade according to claim 1, wherein the gas turbine comprises a working fluid flowpath defined through a compressor positioned at a forward end and a turbine positioned at an aftward end, the orientation of which defines a forward direction and an aftward direction within the gas turbine;
    wherein a flow direction comprises an expected direction of flow of a working fluid through the working fluid flowpath, the flow direction being defined within in the compressor and the turbine as being parallel to a central axis of the gas turbine and oriented in the aftward direction; and
    wherein a rotation direction comprises an expected direction of rotation for the rotor blade during operation of the gas turbine.

3. The rotor blade according to claim 2, wherein the rotor blade comprises one configured for use in the turbine;
    wherein the interface is formed between circumferentially overlapping sections of the pressure wing and the suction wing; and
    wherein:
        the pressure wing comprises a forward face and an aftward face, the forward face facing toward the forward end of the gas turbine and the aftward face facing toward the aftward end of the gas turbine; and
        the suction wing comprises a forward face and an aftward face, the forward face facing toward the forward end of the gas turbine and the aftward face facing toward the aftward end of the gas turbine.

4. The rotor blade according to claim 3, wherein, within the circumferentially overlapping sections of the pressure wing and the suction wing, the pressure wing is positioned forward of the suction wing such that:
    the pressure wing contact face is formed on the aftward face of the pressure wing; and
    the suction wing contact face is formed on the forward face of the suction wing.

5. The rotor blade according to claim 4, wherein:
the pressure wing contact face comprises a non-integral pad that is affixed to and protrudes from a flat section of the aftward face of the pressure wing; and
the suction wing contact face comprises a non-integral pad that is affixed to and protrudes from a flat section of the forward face of the suction wing.

6. The gas turbine according to claim 5, wherein:
the non-integral pad of the aftward face of the pressure wing comprises a substantially constant thickness such that, upon being affixed to the flat section of the aftward face of the pressure wing, the pressure wing contact face is flat;
the non-integral pad of the forward face of the suction wing comprises a substantially constant thickness such that, upon being affixed to the flat section of the forward face of the suction wing, the suction wing contact face is flat; and
wherein each of the non-integral pads comprises a wear resistant material.

7. The gas turbine according to claim 5, wherein an outboard profile comprises a profile of the interface as viewed from an outer radial perspective; and
wherein, per the outboard profile:
relative to a distance from the airfoil, the pressure wing contact face comprises a far edge and a near edge; and
relative to a distance from the airfoil, the suction wing contact face comprises a far edge and a near edge.

8. The gas turbine according to claim 7, wherein, per the outboard profile, the pressure wing contact face and the suction wing contact face each comprises a canted configuration relative to the flow direction; and
wherein:
the canted configuration of the pressure wing contact face comprises a slanting toward the rotation direction of the rotor blade as the pressure wing contact face extends from the far edge to the near edge; and
the canted configuration of the suction wing contact face comprises a slanting toward the rotation direction of the rotor blade as the suction wing contact face extends from the near edge to the far edge.

9. The gas turbine according to claim 8, wherein, per the outboard profile:
the slanting of the pressure wing contact face forms a first angle between the pressure wing contact face and the flow direction, the first angle comprising between 10 and 80 degrees;
the slanting of the suction wing contact face forms a second angle between the suction wing contact face and the flow direction, the second angle comprising between 10 and 80 degrees; and
the predetermined offset of the interface comprises a circumferential offset.

10. The gas turbine according to claim 9, wherein, relative to the rotation direction, the circumferential offset comprises:
the far edge of the suction wing contact face rotationally leading by the circumferential offset the near edge of the pressure wing contact face; and
the near edge of the suction wing contact face rotationally leading by the circumferential offset the far edge of the pressure wing contact face.

11. The gas turbine according to claim 10, wherein the relative movement between the pressure wing contact face and the suction wing contact face within the interface includes an anticipated circumferential deflection;
wherein the circumferential offset is configured to correspond to the anticipated circumferential deflection such that:
the far edge of the suction wing contact face circumferentially aligns with the near edge of the pressure wing contact face when the expected operating condition closes the gap; and
the near edge of the suction wing contact face circumferentially aligns with the far edge of the pressure wing contact face when the expected operating condition closes the gap.

12. The gas turbine according to claim 10, wherein the predetermined offset of the interface comprises a radial offset; and
wherein the radial offset comprises the pressure wing contact face being offset from the suction wing contact face in an outboard direction.

13. The gas turbine according to claim 12, wherein the radial offset comprises:
an outboard edge of the pressure wing contact face being positioned outboard by the radial offset of an outboard edge of the suction wing contact face; and
an inboard edge of the pressure wing contact face being positioned outboard by the radial offset of an inboard edge of the suction wing contact face;
wherein the relative movement between the pressure wing contact face and the suction wing contact face within the interface includes an anticipated radial deflection; and
wherein the radial offset is configured to correspond to the anticipated radial deflection such that:
the outboard edge of the pressure wing contact face radially aligns with the outboard edge of the suction wing contact face when the expected operating condition closes the gap; and
the inboard edge of the pressure wing contact face radially aligns with the inboard edge of the suction wing contact face when the expected operating condition closes the gap.

14. The gas turbine according to claim 10, wherein the predetermined offset of the interface comprises an angular offset, the angular offset comprising a difference between the first angle of the pressure wing contact face and the second angle of the suction wing contact face.

15. The gas turbine according to claim 14, wherein the relative movement between the pressure wing contact face and the suction wing contact face within the interface includes an anticipated angular deflection; and
wherein the angular offset is configured to correspond to the anticipated angular deflection such that the pressure wing contact face angularly aligns with the suction wing contact face when the expected operating condition closes the gap.

16. A gas turbine having a row of rotor blades attached to and circumferentially spaced about a rotor disc, wherein each of the rotor blades within the row of rotor blades comprises:
an airfoil defined between a pressure face and a laterally opposed suction face; and
a midspan shroud comprising a pressure wing extending from the pressure face of the airfoil and a suction wing extending from the suction face of the airfoil;
wherein the pressure wing and the suction wing of the midspan shroud are configured so to cooperatively form an interface between installed neighboring ones of the rotor blades within the row rotor blades; and wherein the interface comprises:
a pressure wing contact face disposed on the pressure wing that opposes across a gap a suction wing contact face disposed on the suction wing;
a predetermined offset between the pressure wing contact face and the suction wing contact face, the predetermined offset being configured for desirably aligning the pressure wing contact face against the suction wing contact face when an expected operating condition closes of the gap such that contact therebetween results;
wherein the predetermined offset of the interface comprises a radial offset; and
wherein the radial offset comprises the pressure wing contact face being offset from the suction wing contact face in an outboard direction.

17. The gas turbine according to claim 16, wherein an outboard profile comprises a profile of the interface as viewed from an outer radial perspective; and
wherein, per the outboard profile:
relative to a distance from the airfoil, the pressure wing contact face comprises a far edge and a near edge; and
relative to a distance from the airfoil, the suction wing contact face comprises a far edge and a near edge;
wherein the predetermined offset of the interface comprises a circumferential offset; and
wherein, relative to the rotation direction, the circumferential offset comprises:
the far edge of the suction wing contact face rotationally leading by the circumferential offset the near edge of the pressure wing contact face; and
the near edge of the suction wing contact face rotationally leading by the circumferential offset the far edge of the pressure wing contact face.

18. A gas turbine having a row of rotor blades attached to and circumferentially spaced about a rotor disc, wherein each of the rotor blades within the row of rotor blades comprises:
an airfoil defined between a pressure face and a laterally opposed suction face; and
a midspan shroud comprising a pressure wing extending from the pressure face of the airfoil and a suction wing extending from the suction face of the airfoil;
wherein the pressure wing and the suction wing of the midspan shroud are configured so to cooperatively form an interface between installed neighboring ones of the rotor blades within the row rotor blades; and
wherein the interface comprises:
a pressure wing contact face disposed on the pressure wing that opposes across a gap a suction wing contact face disposed on the suction wing;
a predetermined offset between the pressure wing contact face and the suction wing contact face, the predetermined offset being configured for desirably aligning the pressure wing contact face against the suction wing contact face when an expected operating condition closes of the gap such that contact therebetween results; and
wherein the predetermined offset of the interface comprises an angular offset, the angular offset comprising a difference between the first angle of the pressure wing contact face and the second angle of the suction wing contact face.

\* \* \* \* \*